United States Patent [19]
Smythe

[11] 3,837,691
[45] Sept. 24, 1974

[54] KNOT TYING APPARATUS

[76] Inventor: Richard N. Smythe, 4082 Deep Valley, Dallas, Tex. 75234

[22] Filed: Apr. 9, 1973

[21] Appl. No.: 349,486

[52] U.S. Cl. ................................................. 289/17
[51] Int. Cl. ............................................. D03j 3/00
[58] Field of Search ...................................... 289/17

[56] References Cited
UNITED STATES PATENTS
3,106,417  10/1963  Clow .................................... 289/17
3,521,918  7/1970  Hammond ............................ 289/17

*Primary Examiner*—Louis K. Rimrodt
*Attorney, Agent, or Firm*—Richards Harris & Medlock

[57] ABSTRACT

Disclosed is an improved knot tying implement for use in attaching a line to an object such as a fishing lure, hook or the like.

9 Claims, 6 Drawing Figures

PATENTED SEP 24 1974 3,837,691

KNOT TYING APPARATUS

BACKGROUND OF THE INVENTION

The present invention relates generally to improvements in knot tying implements. In another aspect, this invention relates to a new and improved knot tying and hook removing implement.

In the sport of fishing, it has become general practice to use clear non-braided monofilament lines. These monofilament lines are stiff and have relatively smooth exteriors, which cause the lines to be difficult to handle and to require complex knots to insure the maximum strength of the line at the knot and to prevent the knot from slipping or coming loose during use.

In attaching monofilament lines to objects such as hooks, swivels, lures, sinkers and the like, it has been a common practice for fishermen to use their hands to hold the object to which the line is to be tied while manipulating the line to form these complex knots. Although such a method of attaching objects to the line has served the purpose, it has not proved entirely satisfactory for the reason that considerable difficulty has been the experience in correctly tying these complex knots and in some instances, the fisherman has been injured by the sharp hooks during the knot tying process.

Therefore, it is the primary purpose of the present invention to provide an improved knot tying implement for use in tying objects to fishing lines, especially monofilament lines.

Therefore, according to one embodiment of this invention, an improved know tying implement is provided with a portion for engaging and holding the object in position and a portion for assisting in forming the knot thereon.

OBJECTS OF THE INVENTION

An object of the present invention is the provision of an improved knot tying implement.

Another object of the present invention is the provision of an improved knot tying and hook removing implement.

A further object of this invention is the provision of an improved knot tying implement which is simple and inexpensive to manufacture and use.

Other objects and many of the attendant advantages of this invention will be readily appreciated by those of ordinary skill in the art as the same becomes better understood by reference to the following Detailed Description when considered in connection with the accompanying drawings, in which:

DESCRIPTION OF THE PREFERRED EMBODIMENT

Figure 1:
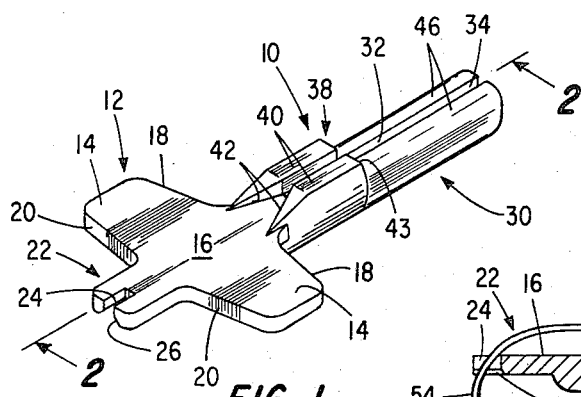
FIG. 1 illustrates a perspective view of the improved knot tying implement of the present invention.

Referring now to the drawings, wherein like reference characters designate like or corresponding parts throughout the several views, there is illustrated the improved knot tying apparatus of the present invention which is designated for purposes of description by reference numeral 10. The implement 10 can be formed in one piece by injection molding of suitable plastics, but it is to be understood, of course, that other materials and methods of forming the implement could be used.

The apparatus 10 is formed with an enlarged or handle end 12, which is used while grasping the apparatus by the user. This enlarged end 12 has two flange portions 14 which form planar surface 16. The edges of this planar surface 16 form two pairs of oppositely facing surfaces 18 and 20, respectively.

Positioned between and extending form the flange portions 14 is a narrow portion 22. This portion 22 has a slot 24 extending therethrough for use in holding lures, hooks and the like in place on the apparatus. One side of the slot 24 has a tapered portion 26 which aids in holding objects in position in the slot.

Extending from the enlarged end 12 is elongated tying portion 30 which has a generally polygonal cross-section. This tying portion 30 extends from the enlarged end 12 in a direction opposite to the portion 22 and has a centrally disposed groove 32 formed along the length thereof. The groove 32 is connected to a slot 34 which extends completely through the portion 30. By grasping the portion 12, the portion 30 can be used as a hook remover with its slot 34 engaging the hook. A ramp surface 36 connects the planar surface 16 and the bottom surface of the groove 32.

An enlarged collar portion 38 is positioned between enlarged end 12 and the portion 30. This enlarged portion 38 has two planar surfaces 40 and are formed thereon which are spaced above the planar surface 16. Planar surfaces 46 are spaced below the surfaces 40 and are formed on the portion 30 along the upper portion of the slot 34. The enlarged portion 38 is also provided with a tapered guideway 42 which is connected to the groove 32. A shoulder 43 separates the enlarged portion 38 from the portion 30.

OPERATION OF THE DEVICE

In FIGS. 2 through 6, the implement 10 is illustrated being used to attach objects and form knots in fishing lines. The portion of the lines identified by "L" extends to a suitable fishing implement, such as a conventional rod and reel or the like. That portion of the line identified by "S" is the free end of the line coming from the fishing implement.

Figure 2:
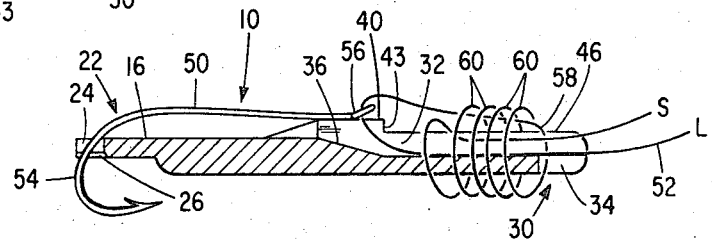
FIG. 2 illustrates a section of the device taken on line 2—2 of FIG. 1, looking in the direction of the arrows with a hook inserted in the implement and the diagrammatic illustration of attaching a monofilament line to the hook by a modified hangman's knot.

In FIG. 2, the implement 10 is illustrated as it is used to attach a hook 50 to a length of fishing line 52 by means of a modified hangman's knot. To attach the hook 50 to the line 52, the hook 50 is first positioned with its bend 54 in the slot 24 and the eye 56 of the hook 50 rests on the surfaces 40. If the hook 50 were longer, the eye 56 could rest on the surfaces 46. The line 52 is next positioned in the groove 32 and the end "S" is inserted through the eye 56 of the hook 50. A sufficient amount of line 52 is then pulled through the eye 56 and positioned back along the groove 32 to the point designated by 58. The line is then passed through slot 34 and four wraps 60 of the line 52 are then formed around the portion 30 and the line in the groove 32 with successive wraps 60 progressing toward the eye 56. The end "S" is then passed back through the groove 32 in a direction away from the hook 50.

While gripping the portions 14, the wraps 60 are moved adjacent to the end of the portion 30 and the end of the line "S" is tensioned by a quick pull. This pull will remove the wraps 60 from the portion 30 and will form the knot in the line. With the knot formed and the hook 50 in position in the slot 24, the portion "L" of the line is tensioned, causing the knot to slide down adjacent to the eye 56. The portion "S" can then be trimmed as desired and the hook 50 removed from the apparatur 10.

Figure 3:
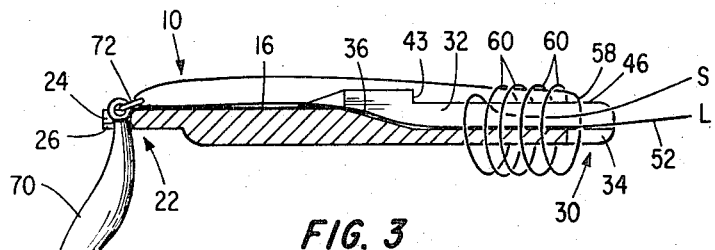
FIG. 3 is similar to FIG. 2 with a lure inserted in the implement and with the diagrammatic illustration of attaching a monofilament line by means of a modified hangmen's knot.

In FIG. 3, the implement 10 is shown being used to assist in attaching line 52 to a lure 70 by means of the identical knot illustrated in FIG. 2. The lure is first positioned with its eye extending up through the slot 24. The tapered portion 26 forms a guide for inserting the lure 70, and once the lure is in the slot, assists in holding the lure in place. The knot is then tied in the same manner as disclosed in FIG. 4 and it is to be understood, of course, that other objects such as swivels, sinkers and the like, could be tied in the same manner as illustrated in FIG. 3 for lure 70.

Figure 4:
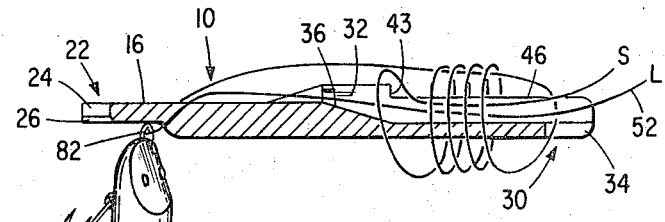
FIG. 4 is a view similar to FIG. 3 with the lure in an alternate position on the implement.

In FIG. 4, a second lure 80 is shown in position for tying a line thereto. This lure 80 has a recessed eye 82, which will not fit into the slot 24. To accommodate this lure 80, the line 52 is passed through the eye 82 and looped around portion 22 until the line is held against the surfaces 20. The line is then positioned in the groove 32 and the knot can be tied as illustrated in FIGS. 2 and 3.

Figure 5:
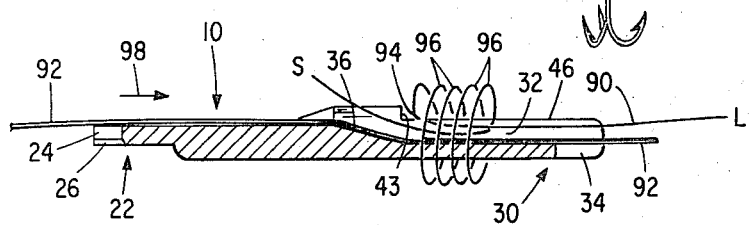
FIG. 5 is a view similar to FIG. 2 which diagrammatically illustrates the attachment of the monofilament leader to fly line.

FIG. 5 illustrates the use of the implement 10 for attaching leader 90 to fly line 92. To form the knot, the leader 90 is positioned in groove 32 to point 94. Then, five wraps 96 are formed on the portion 30, and with each successive wrap progessing in the direction away from the shoulder 43. The end "S" is then inserted into the groove 32 and through wraps 96. Fly line 92 is then inserted in the direction of the arrow 98 into the groove 32, and through wraps 96. The knot is then slipped off of the portion 30 and pulled tight around the fly line 92 to attach the leader 90 to the line 92.

A hook may also be attached to the leader 90 in the manner described in FIG. 5. As previously described, the knot is formed with the wraps 96 around portion 30 and end "S" inserted through the groove 32. Thereafter, instead of inserting fly line 92 through the wraps 96, the shaft of a hook is inserted in the direction of arrow 98. Then, the knot is slipped off the portion 30 and is pulled tight around the shank of the hook. It is also envisioned that the leader 90 could be inserted through the eye of the hook and then the Snell knot could be formed on the implement as described above.

Figure 6:
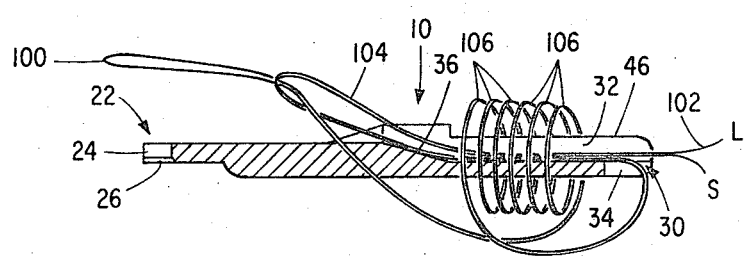
FIG. 6 is a view similar to FIG. 2 illustrating a further use of the apparatus in forming a spider hitch knot in monofilament line.

In FIG. 6, a method of tying a spider hitch knot by use of the apparatus is illustrated. An elongated loop 100 is formed in the line 102. A second loop 104 is formed in the double portion of the line of loop 100. This second loop 104 is positioned in the groove 32 and the free end of the loop 100 is then wrapped eight times around the portion 30 and the loop 104. The free end of the loop 100 is then inserted through the loop 104; the knot is pulled tight and slipped off the portion 30.

It is to be understood, of course, that the foregoing disclosure relates to a preferred embodiment of the invention and that numerous modifications and alterations can be made therein without departing from the spirit and scope of the invention as defined in the appended claims.

I claim:

1. An implement for forming a knot to attach a line to an oject such as a hook, lure or the like comprising an elongated rigid body, a handle formed at one end of said body, said handle has two flange portions extending transverse to the length of said body for grasping said implement, means for positioning said object on said body during tying of said line to said object, said positioning means being located adjacent said one end of said body, and a knot forming portion extending from the other end of said body, said knot forming portion comprising an elongated non-tapered portion and a groove extending along the length of said elongated portion from said handle to said other end of said body.

2. An implement as defined in claim 1, wherein said handle forms a planar surface.

3. An implement as defined in claim 1, wherein a guideway is formed on said planar surface at one end of said groove.

4. An implement as defined in claim 1, wherein said means for positioning said object is a second elongated portion extending from said handle in a direction away from said knot tying portion and wherein a slot is formed in said second elongated portion.

5. An implement as defined in claim 4, wherein a taper is formed on said slot.

6. An implement as defined in claim 1, wherein a slot is formed in said elongated portion of said knot forming portion, said slot being located adjacent said other end.

7. An implement as defined in claim 1, wherein said elongated portion adjacent to said groove defines a second planar surface.

8. An implement as defined in claim 7, wherein a shoulder is formed on said elongated portion, between said second planar surface and said handle.

9. An implement as defined in claim 8, wherein a third planar surface is formed between said handle and said shoulder.

* * * * *

UNITED STATES PATENT OFFICE
CERTIFICATE OF CORRECTION

Patent No. 3,837,691           Dated Sept. 24, 1974

Inventor(s) Richard N. Smythe

It is certified that error appears in the above-identified patent and that said Letters Patent are hereby corrected as shown below:

Col. 1, line 32, change "know" to --knot--.

Col. 2, line 26, change "form" to --from--.

Col. 2, line 45, delete "and are".

Col. 3, line 21, change "apparatur" to --apparatus--.

Signed and sealed this 3rd day of December 1974.

(SEAL)
Attest:

McCOY M. GIBSON JR.                C. MARSHALL DANN
Attesting Officer                  Commissioner of Patents